United States Patent
Murata

(10) Patent No.: US 11,023,792 B2
(45) Date of Patent: Jun. 1, 2021

(54) TERMINAL DEVICE HAVING COMMUNICATION INTERFACE CONFIGURED TO COMMUNICATE WITH PRINTER, AND NON- TRANSITORY COMPUTER-READABLE RECORDING MEDIUM CONTAINING INSTRUCTIONS THEREFOR

(71) Applicant: BROTHER KOGYO KABUSHIKI KAISHA, Nagoya (JP)

(72) Inventor: Mareyuki Murata, Ogaki (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 16/561,389

(22) Filed: Sep. 5, 2019

(65) Prior Publication Data
US 2020/0097784 A1    Mar. 26, 2020

(30) Foreign Application Priority Data
Sep. 21, 2018   (JP) .............................. JP2018-176883

(51) Int. Cl.
G06K 15/00 (2006.01)
G03G 15/20 (2006.01)
G06K 15/02 (2006.01)

(52) U.S. Cl.
CPC ..... *G06K 15/4025* (2013.01); *G03G 15/2039* (2013.01); *G06K 15/028* (2013.01)

(58) Field of Classification Search
None
See application file for complete search history.

(56) References Cited

U.S. PATENT DOCUMENTS

| 2016/0004203 A1* | 1/2016 | Hashii | B65H 5/062 399/396 |
| 2016/0217353 A1* | 7/2016 | Nagashima | H04N 1/00676 |
| 2017/0217187 A1* | 8/2017 | Yamada | H04N 1/00602 |
| 2019/0122351 A1* | 4/2019 | Honma | G06F 3/1288 |

FOREIGN PATENT DOCUMENTS

JP      2006-011120 A      1/2006

* cited by examiner

*Primary Examiner* — Frantz Bataille
(74) *Attorney, Agent, or Firm* — Scully Scott Murphy and Presser

(57) ABSTRACT

Whether there exists a side area image within side areas of the recording medium is determined. When it is determined that there exists no image within the side areas, a command is transmitted to a printer. The command causes a printer to start conveying of the recording medium at an earlier timing. The side areas of the recording medium are difficult to be heated by a heater arranged at a central portion of a fixing roller. Therefore, in order to heat the side areas, a long time for heating by the heater is necessary. When there is no image within the side areas, the heating time is shortened. Thereby, it is possible to start conveying the recording medium at an early timing, and a time period for completing a printing operation can be shortened.

15 Claims, 9 Drawing Sheets

TERMINAL DEVICE HAVING COMMUNICATION INTERFACE CONFIGURED TO COMMUNICATE WITH PRINTER, AND NON- TRANSITORY COMPUTER-READABLE RECORDING MEDIUM CONTAINING INSTRUCTIONS THEREFOR

CROSS-REFERENCE TO RELATED APPLICATIONS

This application claims priority under 35 U.S.C. § 119 from Japanese Patent Application No. 2018-176883 filed on Sep. 21, 2018. The entire subject matter of the application is incorporated herein by reference.

BACKGROUND

Technical Field

The present disclosures relate to a terminal device having a communication I/F configured to communication with a printer, and a non-transitory computer-readable recording medium containing instructions for such a terminal device.

Related Art

There has been known a conventional printer configured such that images are printed on conveyed printing sheets by transferring toner onto the conveyed printing sheets and applying heat by a heating section. In such a conventional printer including the heating section, conveyance of the printing sheets is typically started after the heating section have been heated to a certain degree.

SUMMARY

In the conventional printer mentioned above, conveyance of the printing sheets is not started until a temperature of the heating section reaches a particular temperature, thereby loss of time being caused.

According to aspects of the present disclosure, there is provided a non-transitory computer-readable recording medium containing computer-executable instructions to be executed by a computer of a terminal device having a communication interface configured to communicate with a printer, the printer being configured to print an image on a conveyed recording medium. The instructions causes, when executed by the computer, the terminal device to perform determining whether, based on image data indicating an image to be printed by the printer, an amount of a side area image is equal to or less than a particular amount, the side area image being an image arranged within side areas of the recording medium and being an image to be printed on the recording medium by the printer, the side areas being defined to be end portions of the recording medium and having a particular width, and, when the amount of the side area image within the side areas is determined to be equal to or less than the particular amount, transmitting a command, which causes the printer to start conveying of the recording medium at a first timing, to the printer through the communication interface, the first timing being a timing earlier than a second timing at which conveying of the recording medium is started when the amount of the side area image within the side areas is determined to be more than the particular amount.

According to aspects of the present disclosure, there is provided a non-transitory computer-readable recording medium containing computer-executable instructions to be executed by a computer of a terminal device having a communication interface configured to communicate with a printer, the printer being configured to print an image on a conveyed recording medium. The instructions causes, when executed by the computer, the terminal device to perform determining whether, based on image data indicating an image to be printed by the printer, an amount of a particular image is equal to or less than a particular amount, the particular image being an image arranged within a particular area of the recording medium and being an image to be printed on the recording medium by the printer, the particular area being defined to be a particular position of the recording medium to be conveyed by the printer and having a particular width, and, when the amount of the image within the particular area is determined to be equal to or less than the particular amount, transmitting a command instructing the printer to start conveying of the recording medium at a first timing, to the printer through the communication interface, the first timing being a timing earlier than a second timing at which conveying of the recording medium is started when the amount of the image within the particular area is determined to be more than the particular amount.

BRIEF DESCRIPTION OF THE ACCOMPANYING DRAWINGS

Figure 7:
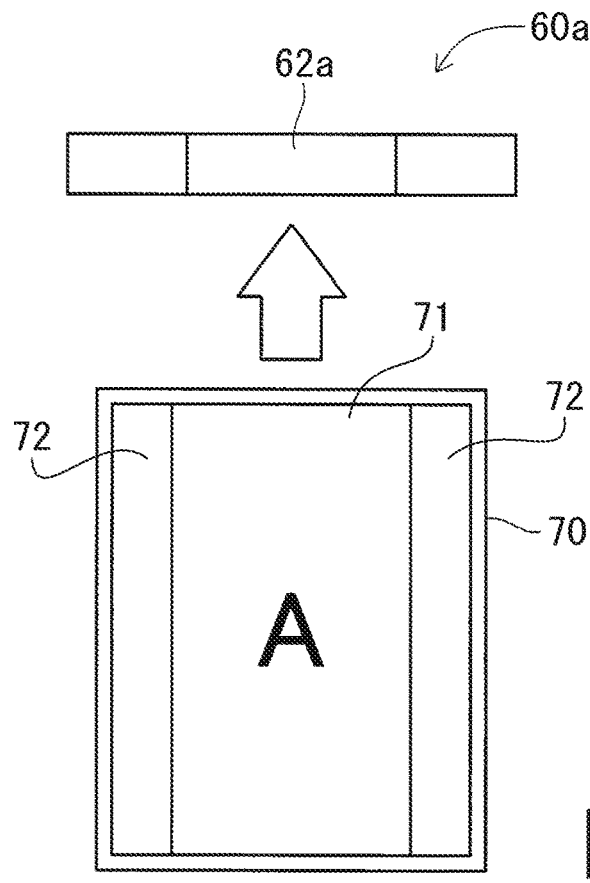

FIG. 7 schematically shows a state where a portrait image is printed on a printing sheet which is conveyed in a portrait orientation.

Figure 8:
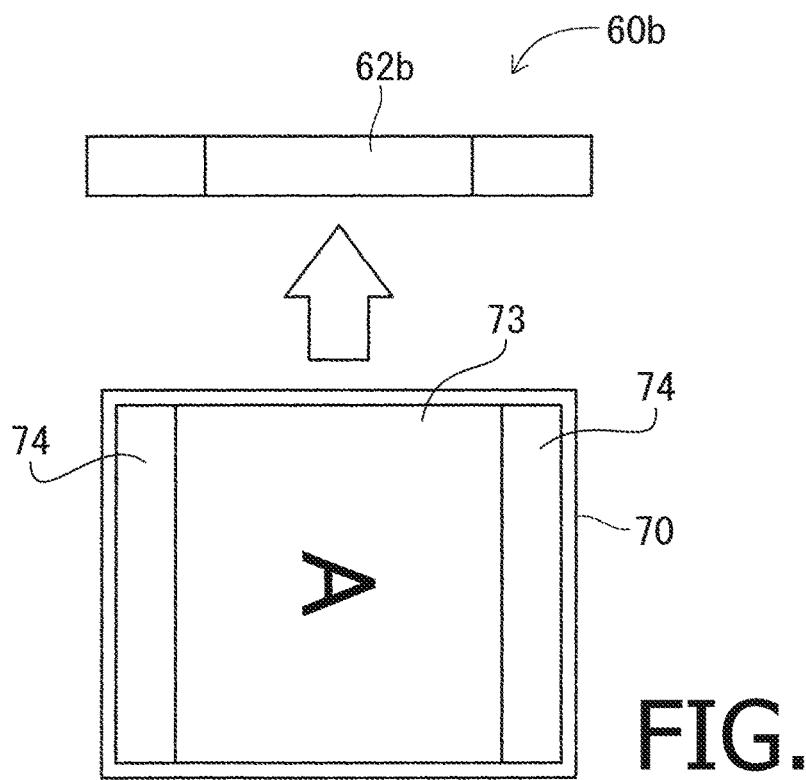

FIG. 8 schematically shows a state where a portrait image is printed on a printing sheet which is conveyed in a landscape orientation.

Figure 9:
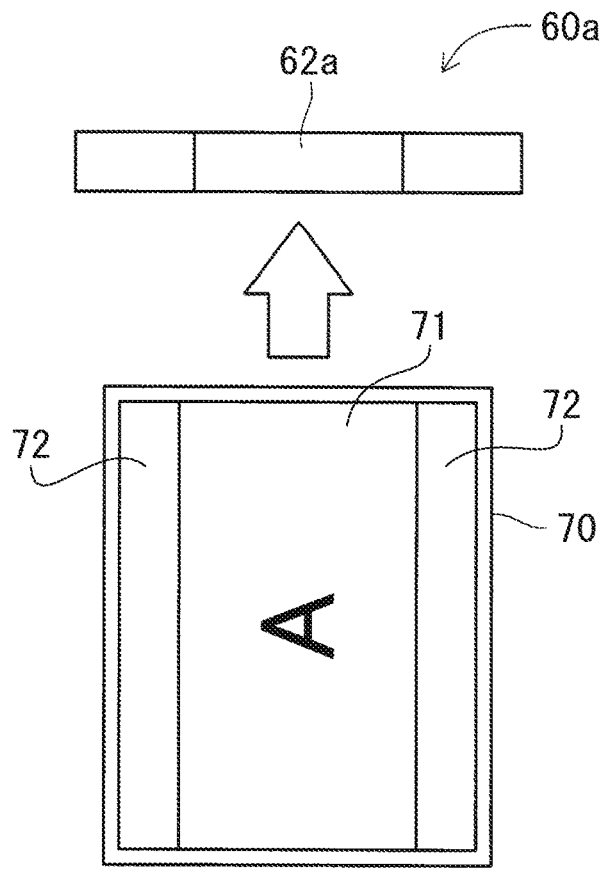

FIG. 9 schematically shows a state where a landscape image is printed on a printing sheet which is conveyed in a portrait orientation.

Figure 10:
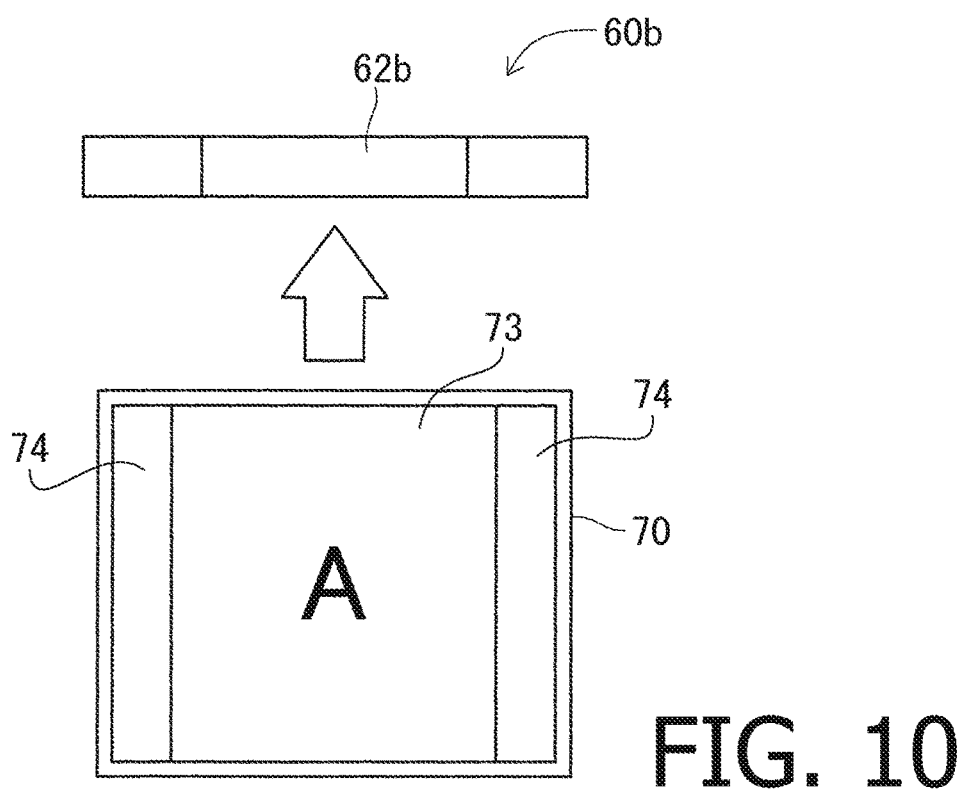

FIG. 10 schematically shows a state where a landscape image is printed on a printing sheet which is conveyed in a landscape orientation.

Figure 11:
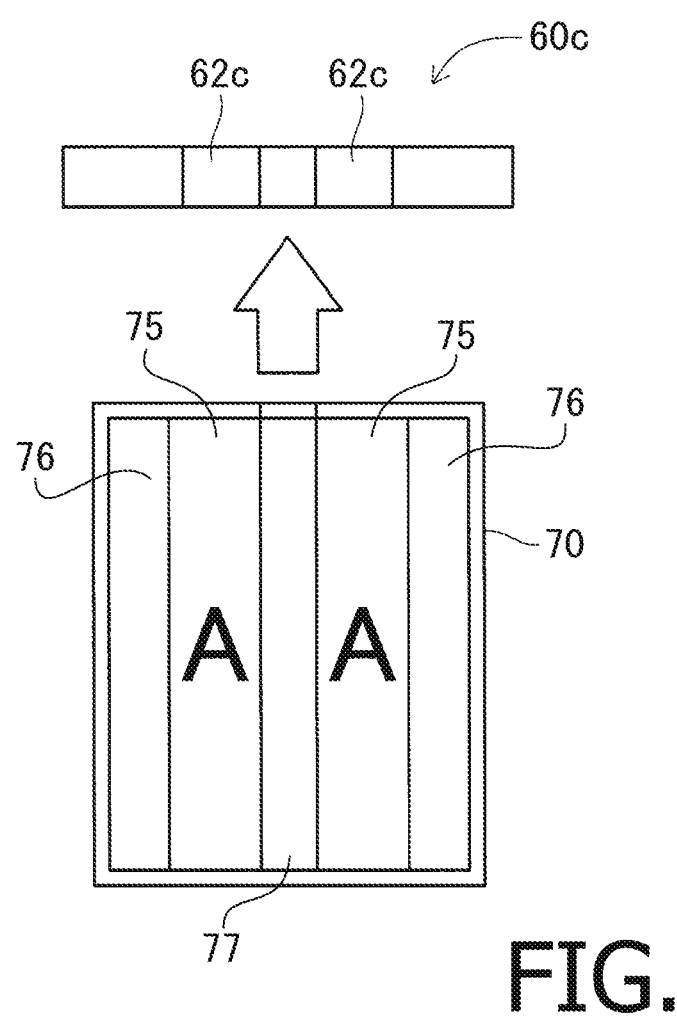

FIG. 11 schematically shows a heat roller to which two heaters are provided.

DETAILED DESCRIPTION OF EMBODIMENT

Figure 1:
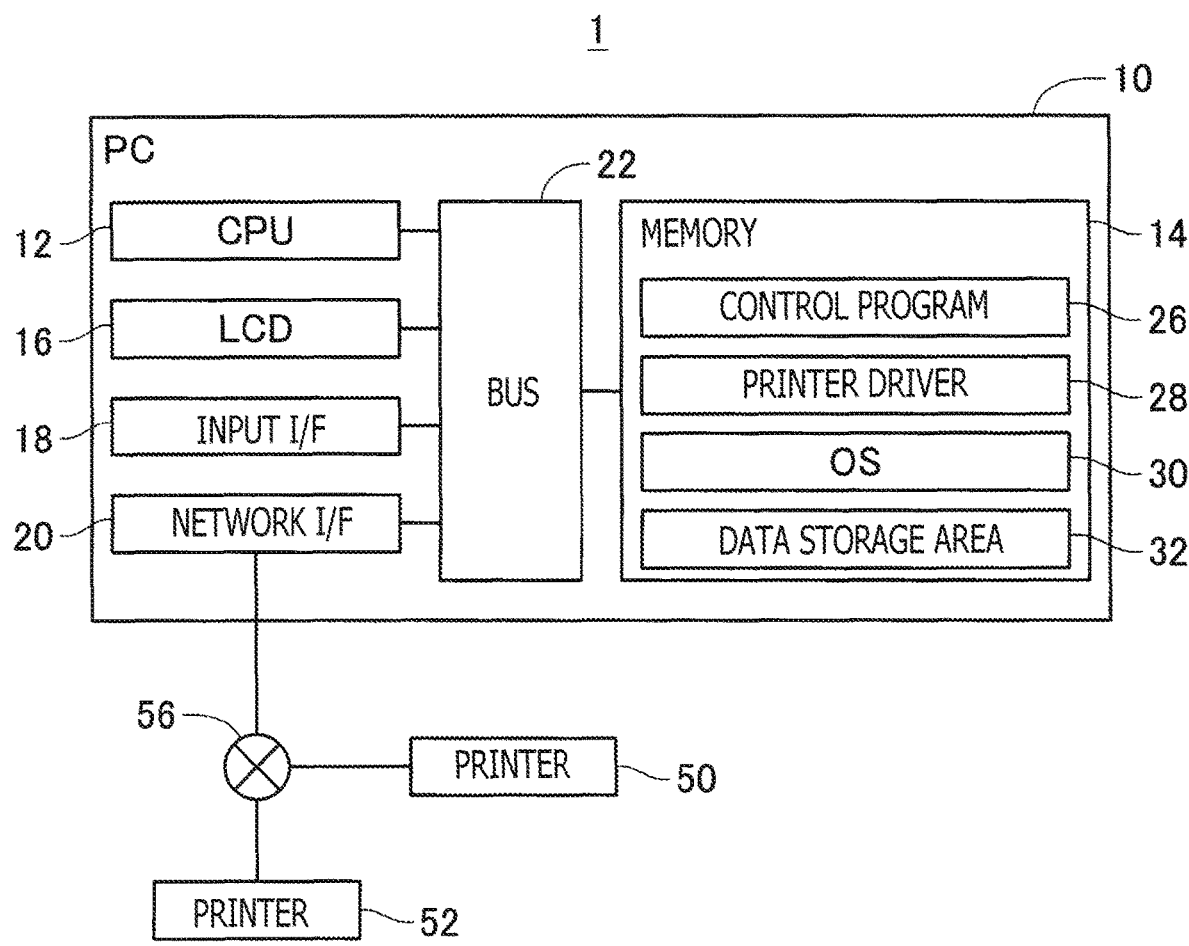
FIG. 1 is a block diagram of a communication system 1 according to an illustrative embodiment of the present disclosures.

FIG. 1 is a block diagram showing a communication system 1 according to an embodiment of the present disclosures. The communication system 1 is provided with a PC (which is an example of a terminal device) 10, a printer 50 and a printer 52.

The PC 10 mainly includes a CPU (which is an example of a processor) 12, a memory 14, an LCD 16, an input I/F 18 and a network I/F (which is an example of a communication I/F) 20, which are configured to communicate with each other through a bus 22.

The PC 10 is communicatable with each of the printer 50 and the printer 52 through the network I/F 20 and the network 56. As a communication method, a wired LAN, a USB, Wi-Fi® and/or Bluetooth® may be employed.

Each of the printers 50 and 52 is a laser printer which is configured to print images on A4 size (i.e., 210 mm×297 mm) printing sheets (which are example of a printing medium having a rectangular shape). The laser printer is configured such that a charged photosensitive drum is exposed to a modulated laser beam, thereby an electrostatic latent image being formed thereon. Then, toner is adhered to the photosensitive drum on which the latent image is formed, thereby a toner image is formed on the photosensitive drum. The toner image is transferred onto the printing sheet which is conveyed inside a body of the laser printer. Thereafter, heat is applied to the transferred toner by a fixing device, thereby the toner image is permanently fixed onto the printing sheet. According to the illustrative embodiment, the fixing device has a fixing roller 60a or a fixing roller 60b (see FIGS. 7 and 8). At a central portion of the fixing roller 60a or 60b, in an axial direction thereof, a heater 62a or 62b (see FIGS. 7 and 8) is arranged. According to such a configuration, the heat and a pressure are applied to the toner image transferred onto the printing sheet 70 by the fixing roller 60a or 60b, and the transferred toner is fixed onto the printing sheet 70 by thermal compression. In the following description, the heater 62a of the fixing roller 60a or the heater 62b of the fixing roller 60b may collectively be referred to as a heater 62 of a fixing roller 60.

It is noted that, in each of FIGS. 7 and 8, a conveying direction of the printing sheet 70 is indicated by an arrow. In the printer 50, the A4 size printing sheet 70 is conveyed in a direction along a longitudinal direction of the printing sheet 70 as shown in FIG. 7. In the printer 52, the A4 size printing sheet 70 is conveyed in a direction along a direction perpendicular to the longitudinal direction (i.e., a direction along the shorter side) of the printing sheet 70 as shown in FIG. 8. Therefore, a length, in the axial direction, of a fixing roller 60a of the printer 50 is longer than a length of the shorter side of the printing sheet 70. Regarding the printer 52, a length, in the axial direction, of a fixing roller 60b is longer than a length of the longer side of the printing sheet 70 as shown in FIG. 8.

The CPU 12 performs processes in accordance with a control program 26, a printer driver (an example of a program) 28 and an OS (an example of an external program) 30 stored in a memory 14. The control program 26 is a program configured to create image data and output the created image data to the printer driver 28 through the OS 30. The printer driver 28 is a device driver for the printers 50 and 52 and controls, when executed by the CPU 12, operations of the printers 50 and 52. The OS 30 is a program providing basic functions which are utilized by the control program 26 and the printer driver 28. It is noted that, in the following description, the CPU 12 executing the printer driver 28 may be referred to by the name of the program (i.e., the printer driver 28). For example, an expression "the printer driver 28 performs . . . " is used to mean "the CPU 12 executing the printer driver 28 performs . . . "

The memory 14 has a data storage area 32. The data storage area 32 is an area for storing data which is necessary when the printer driver 28 is executed. It is noted that the memory 14 is configured by a combination of a RAM, a ROM, a flash memory, an HDD, a buffer provided to the CPU 12 and the like.

The memory 14 may be a computer-readable storage medium. The computer-readable storage medium is a non-transitory medium. Examples of the non-transitory medium are, besides the above-described memory 14, recording medium such as a CD-ROM, a DVD-ROM and the like. It is noted that the non-transitory medium is also a tangible medium. In contrast, an electric signal carrying a program, which is being downloaded from a server on the Internet, is a signal medium which is a kind of computer-readable media, but not included in the non-transitory computer-readable medium.

The LCD 16 is configured to display various pieces of information regarding the PC 10. It is noted that the display need not be limited to the LCD, but other types of displays (e.g., an organic EL display) may be employed. The input I/F 18 is an interface through which user operations are input. The input I/F 18 includes keyboard, a mouse and the like. The input I/F 18 may be a touch panel integrally provided onto a displaying surface of the LCD 16.

In the specification, processes of the CPU 12 according to the instructions described in programs will be mainly described. That is, processes to "judge," "extract," "select," "calculate," "determine," "identify," "specify," "obtain," "receive," "control" and the like are those performed by the CPU 12. It is noted that the processes performed by the CPU 12 may include control of hardware through the OS 30. It is also noted that the term "obtain" is used to mean a concept which does not necessarily include a concept of requesting. That is, a process of the CPU 12 to receive data without requesting therefor is also included in a concept that "the CPU 12 obtains data." Further, a term "data" in the specification is represented by a computer-readable bit array. A plurality of pieces of data having substantially the same meaning but different formats will be treated as the same data. A term "information" used in the specification will be treated in the same manner. Further, the processes of "instruct", "respond" and "request" are executed by communicating information indicating "instruct", "respond" and "request", respectively. Further, a process of "set" is executed by storing input setting information to a memory.

In the communication system 1 configured as above, the image data created by the control program 26 is output to the printer driver 28 through the OS 30. When receiving the image data, the printer driver 28 creates printing image data (i.e., image data for printing) based on the received image data, and transmits the created printing image data to the printer 50 and/or 52, thereby a printing process being performed by the printer 50 and/or 52 based on the printing image data.

As described above, both the printers 50 and 52 are laser printers, when a printing process is started, conveyance of the printing sheets 70 is started after the heater 62 of the fixing roller 60 is heated for a particular period of time, and the printing process of printing an image on the conveying printing sheet 70 is performed. It is noted that the heater 62 is heated in advance for the particular period of time since, if the fixing roller 60 is not sufficiently heated, the toner transferred on the printing sheet cannot be well fixed and it is not guaranteed that an image is appropriately printed on the printing sheet 70. In particular, according to the configurations of the printers 50 and 52 (see FIGS. 7 and 8), the heater 62 is arranged at a central portion, in the axial direction, of the fixing roller 60, but does not extend to end portions of the fixing roller 60. Because of this configuration, when width of the printing sheet 70 is greater than width of the heater 62 in the axial direction, in order to have both end portions of the fixing roller 60, in the axial direction, sufficiently heated before the conveyance of the printing sheet 70 is started, the fixing roller 60 is heated, without conveying the printing sheet 70, for a particular period (which will be referred to as X seconds). According to the above control, the both end portions of the fixing roller 60 as well as the central portion thereof, in the axial direction, can be sufficiently heated, and it is guaranteed that the toner image transferred onto the printing sheet 70 is permanently fixed thereon.

It should be noted that there could be an image which is printed on an entire area, except for marginal areas, of the printing sheet 70 (which will be referred to as a printable area), and there could also be an image which is not printed on both end portions (which will be referred to as side areas: examples of a particular area) of the printable area in a direction perpendicular to a conveying direction but printed only on the printable area except for the side areas (which will be referred to as a central area). It is noted that the side areas and the central area depend on the conveying direction of the printing sheet 70.

In the printer 50, the printing sheet 70 is conveyed in a portrait orientation (i.e., the conveying direction coincides with the longer side of the printing sheet 70) as shown in FIG. 7. In this configuration, the side areas 72 are defined as both side areas, in a direction perpendicular to the longitudinal direction of the printing sheet 70, of the printing sheet 70. In the following description, such side areas 72 will be referred to as portrait-orientation side areas (which are examples of a second direction side area). Further, the central area 71 in this case is an area sandwiched by the portrait-orientation side areas 72. When no images are to be printed on the portrait-orientation side areas, no toner images are transferred on the portrait-oriented side areas 72 of the printing sheet 70 corresponding to both end portions, in the axial direction, of the fixing roller 60*a*. Accordingly, in this case, the both end portions of the fixing roller 60*a* need not be heated since there are no toner images to which the heat and pressure are applied on the portrait-orientation side areas 72.

In the printer 52, the printing sheet 70 is conveyed in a landscape orientation (i.e., the conveying direction coincides with the shorter sides of the printing sheet 70) as shown in FIG. 8. In this configuration, the side areas 74 are defined as both side areas, in the longitudinal direction, of the printing sheet 70. In the following description, such side areas 74 will be referred to as landscape-orientation side areas (which are examples of a first direction side area). Further, the central area 73 in this case is an area sandwiched by the landscape-orientation side areas 74. When no images are to be printed on the landscape-orientation side areas 74, no toner images are transferred on the landscape-oriented side areas 74U, 74D of the printing sheet 70 corresponding to both end portions, in the axial direction, of the fixing roller 60*b*. Accordingly, in this case, the both end portions of the fixing roller 60*b* need not be heated since there are no toner images to which the heat and pressure are applied on the landscape-orientation side areas 74. It is noted that a width of each of the portrait-orientation side areas 72 and each of the landscape-orientation side areas 74 of the printing sheet 70 has a particular width (e.g., a width corresponding to 100 pixels of an image).

When there are no images on the side areas 72, 74 of the prating sheet 70, it is not necessary to heat the both axial end portions of the fixing roller 60*b*. That is, it is unnecessary to heat the fixing roller 60*b* by the heater 62*b* in advance for the particular period (i.e., for X seconds). Accordingly, when there are no images to be fixed on the side areas 72, 74 of the printing sheet 70, it is sufficient to heat the fixing roller 60*b* by the heater 62*b* for a period less than the particular period (e.g., for Y (<X) seconds) before conveyance of the printing sheet 70 is started. According to this configuration, the heating period to heat the fixing roller 60*b* by the heater 62*b* is shortened and a time period for completing a printing operation can be shortened.

Whether there exists an image in each side area 72, 74 is determined by the printer driver 28 using a banding technique provided by the OS 30. The banding technique is a technique to divide an image for one page into a plurality of small portions respectively corresponding to a plurality of small areas. When the printer 28 requests the OS 30 for image data for an arbitrary area, the OS 30 outputs image data corresponding to the designated area (i.e., the arbitrary area of which the image date is requested) to the printer driver 28. It is noted that, if there are no images within the designated area, the OS 30 does not output the image data corresponding to the designated area even if the OS 30 receives the request for the image data form the printer driver 28. Accordingly, when the printer driver 28 requests for the image data of an image arranged within the side areas 72, 74 but does not receive the requested image data, the printer driver 28 determines that there are no images within the side areas 72, 74. On the other hand, when the printer driver 28 requests for the image data of an image arranged within the side areas 72, 74 and obtains the same as the requested image data, the printer driver 28 determines that there exists image data within the side areas 72, 74. It is noted that an image arranged within the side areas 72, 74 is an example of a side area image.

It is noted that the image data, for which the printer driver 28 requests the OS 30, of the image to be arranged within the side areas 72, 74 are different depending on the orientation of the image. In the example shown in FIG. 7, the printing sheet 70 is conveyed in the portrait orientation in the printer 50. In this case, both end portions in the direction perpendicular to the longer side direction of the printing sheet 70 (i.e., the portrait-orientation side areas 72) are the side areas. When the image to be printed is a portrait image, that is, the image to be printed is elongated in a vertical direction (i.e., in an up-and-down direction), right and left side portions of the portrait image are to be printed on the portrait-orientation side areas 72.

Therefore, when the device which is to perform the printing operation is the printer 50 and the image subject to be printed is the portrait image, the printer driver 28 requests the OS 30 for the image data of the right and left portions of the portrait image (hereinafter, referred to as right-and-left side image data). In a case where the printer driver 28 requests for the image data of the right-and-left side image data but the printer driver 28 has not obtained the right-and-left side image data, the printer driver 28 determines that there exists no image arranged within the side areas 72. When the OS 30 outputs at least one of image data of the right-side of the portrait image (hereinafter, referred to as right-side image data) and image data of the left-side of the portrait image (hereinafter, referred to as left-side image data) in response to the request by the printer driver 28 (i.e., when the printer driver 28 obtains at least one of the right-side image data and the left-side image data), the printer driver 28 determines that there exists an image within the side areas 72.

When the image to be printed is a landscape image (i.e., an image elongated in the right-and-left direction), as shown in FIG. 9, upper and lower portions of the image are images to be printed on the portrait-orientation side areas 72 by the printer 50. Therefore, when a device that performs the printing process is the printer 50 and the image subject to be printed is the landscape image, the printer driver 28 requests the OS 30 for image data of the upper and lower portions of the portrait image (hereinafter, referred to as upper-and-lower side image data). In a case where the printer driver 28 requests for the upper-and-lower side image data but has not obtained the upper-and-lower side image data from the OS 30, the printer driver 28 determines that there exists no image to be arranged within the side areas 72. When the OS 30 outputs at least one of image data of the upper side of the portrait image (hereinafter, referred to as upper-side image data) and image data of the lower-side of the portrait image (hereinafter, referred to as lower-side image data) in response to the request by the printer driver 28 (i.e., when the printer driver 28 obtains at least one of the upper-side image data and the lower-side image data), the printer driver 28 determines that there exists an image to be arranged within the side areas 72.

In the printer 52, as shown in FIG. 8, the printing sheet 70 is conveyed in the landscape orientation direction. Accordingly, both end portions in the longitudinal direction of the printing sheet 70 (i.e., the landscape-orientation side areas 74) are the side areas. When an image to be printed is a portrait-orientation image, both end portions, in the up-and-down direction, of the portrait-orientation image are to be printed on the landscape-orientation side areas 74.

Therefore, when the device that performs the printing process is the printer 52 and the image subject to be printed is the portrait image, the printer driver 28 requests the OS 30 for the upper-and-lower image data. When the printer driver 28 requests for the upper-and-lower side image data but has not received the upper-and-lower side image data from the OS 30, the printer driver 28 determines that there exists no image to be printed on the side areas 74. When the OS 30 outputs at least one of the upper-side image data and the lower-side image data in response to the request by the printer driver 28 (i.e., when the printer driver 28 obtains at least one of the upper-side image data and the lower-side image data), the printer driver 28 determines that there exists an image to be arranged within the side areas 74.

When the image to be printed by the printer 52 is the landscape image, both end portions, in the right-and-left direction, of the landscape-orientation image are to be printed on the landscape-orientation side areas 74. Therefore, when the device that performs the printing process is the printer 52 and the image subject to be printed is the landscape-orientation image, the printer driver 28 requests the OS 30 for the right-and-left side image data. When the printer driver 28 requests for the right-and-left image data but has not obtained the right-and-left image data from the OS 30, the printer driver 28 determines that there exists no image to be arranged within the side areas 74. When the printer driver 28 has obtained at least one of the right-side image data and the left-side image data as the OS 30 outputs the same in response to the request therefor, the printer driver 28 determines that there exists an image to be arranged within the side areas 74.

As described above, the printer driver 28 determines presence/absence of the image to be printed within the side areas 72, 74. When it is determined that there exists no image to be printed within the side areas 72, 74, the printer driver 28 transmits an instruction to start feeding the printing sheet 70, at an early stage, to the printer 50 or 52 that performs the printing process. That is, the printer driver 28 transmits an instruction to start feeding the printing sheet 70 after the heater 62 applies heat to the fixing roller 60 for Y seconds. According to this configuration, since the conveyance of the printing sheet 70 is started after the heater 62 applies heat to the fixing roller for Y seconds (which is less than X seconds), a time period necessary for the printing operation can be shortened.

Once heating of the fixing roller 60 by the heater 62 has been completed, the printing process for the next page is sequentially performed at every completion of the printing process for one page (i.e., current page). That is, when the printing process is performed for a plurality of pages, determination of presence/absence of the image to be printed within the side areas 72, 74 is performed only for the first page printed by the printer. When a one-side printing is performed, the printing process proceeds sequentially from the first page in the printer. Therefore, whether there exists an image within the side areas 72, 74 is determined for the image to be printed on the first page. When a both-side printing is performed, after an image is printed on one surface of the printing sheet, another image is printed on another surface of the printing sheet. Typically, after an image for an even number page is printed on one surface of the printing sheet 70, an image for an odd page, which is before the even number page by one page, is printed on the other surface of the same printing sheet 70. Accordingly, when the both-side printing is performed, the image for the second page is firstly printed on the printing sheet 70. Therefore, it is necessary to determine whether there exists an image to be printed within the side areas 72, 74 for the image to be printed on the second page. Hereinafter, a process for such a configuration will be described referring to flowcharts shown in FIGS. 2-3 and 4-6.

Figure 2:
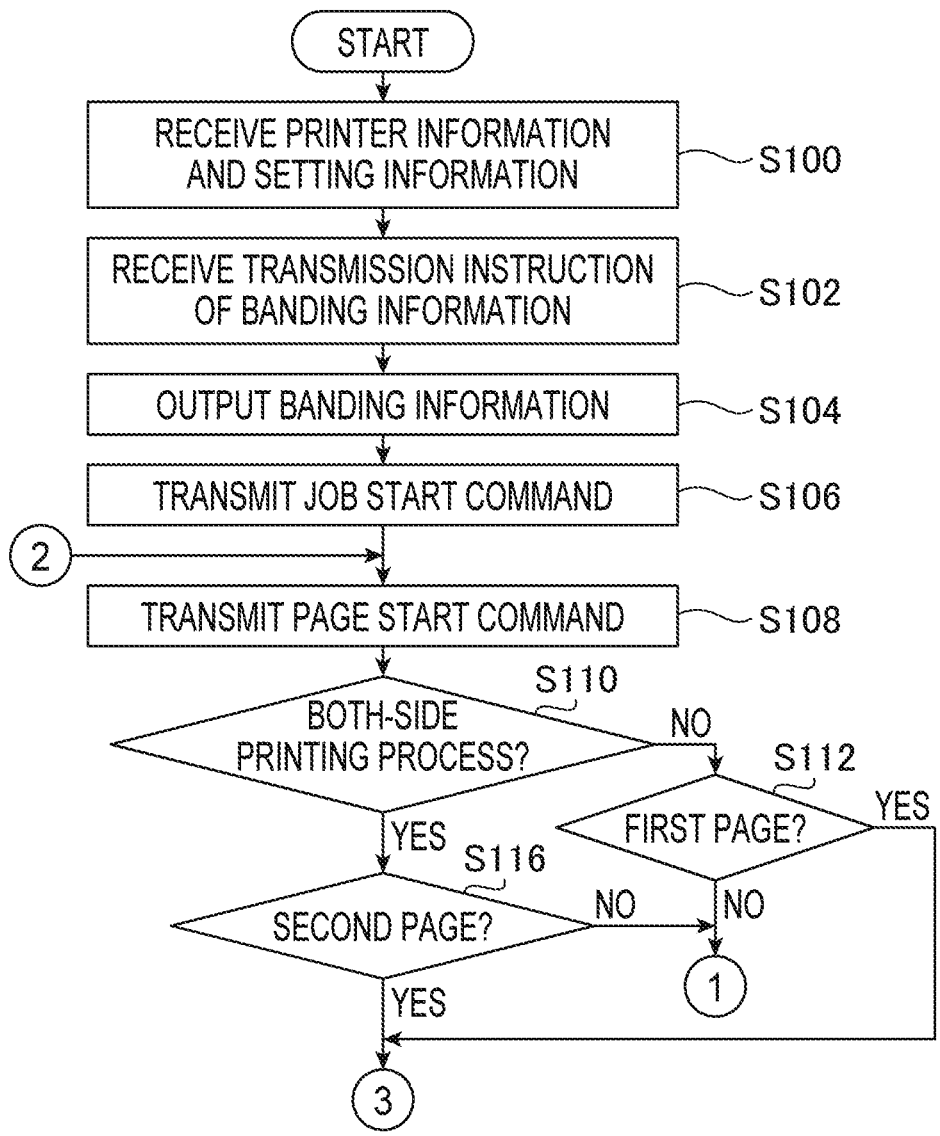
FIGS. 2-6 show a flowchart illustrating a process when a printer driver is executed.
Figure 3:
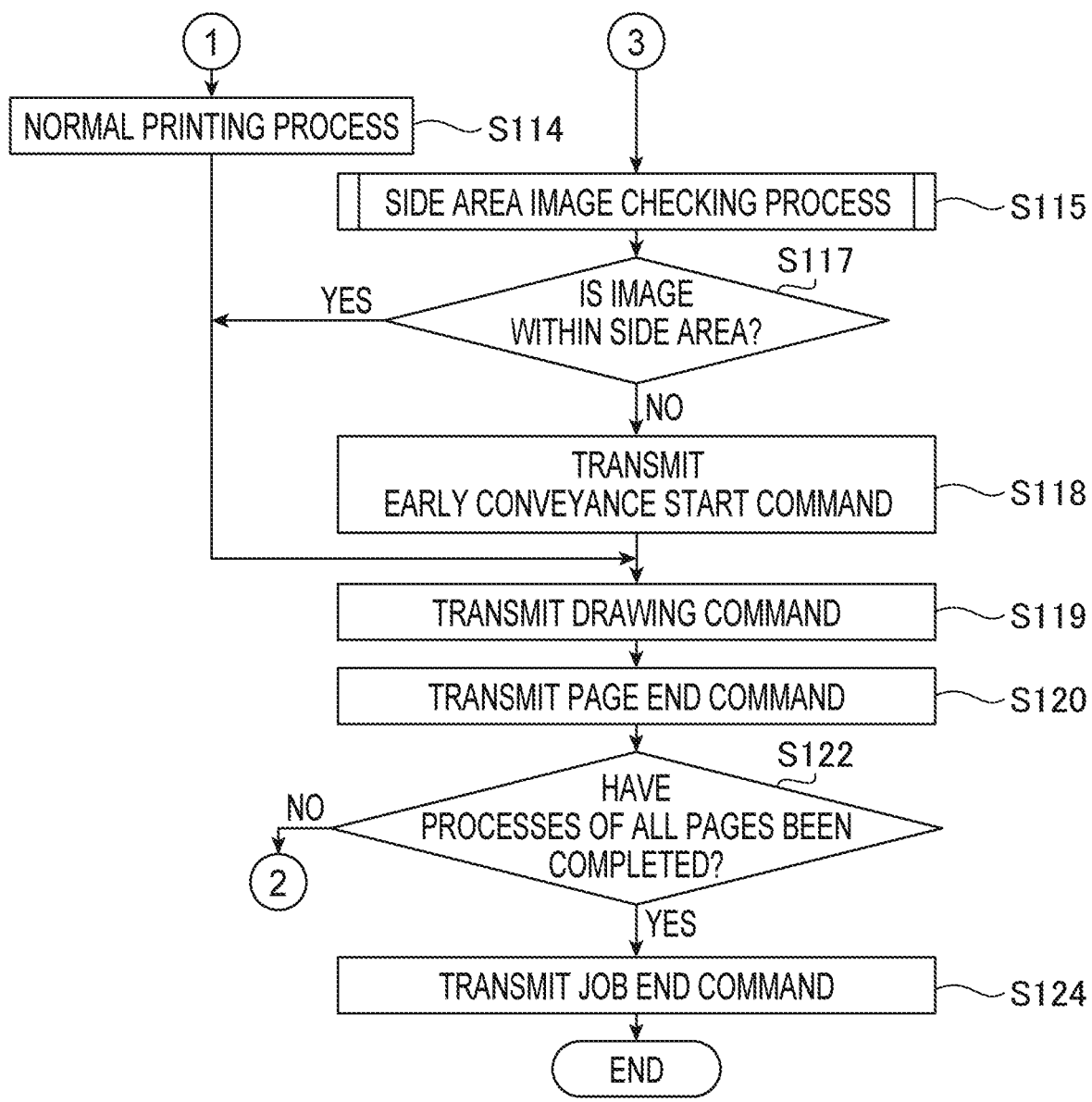
Figure 4:
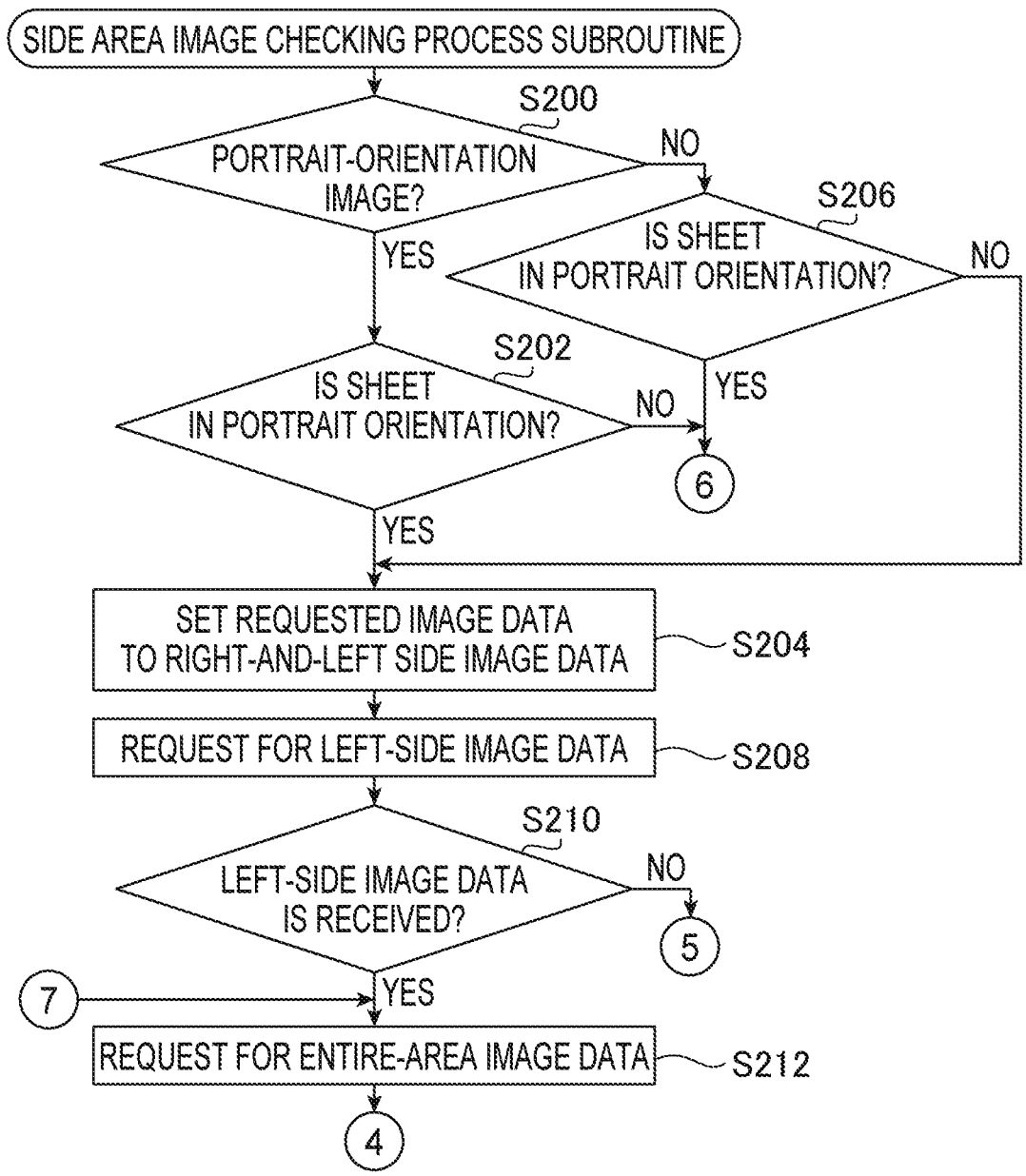
Figure 5:
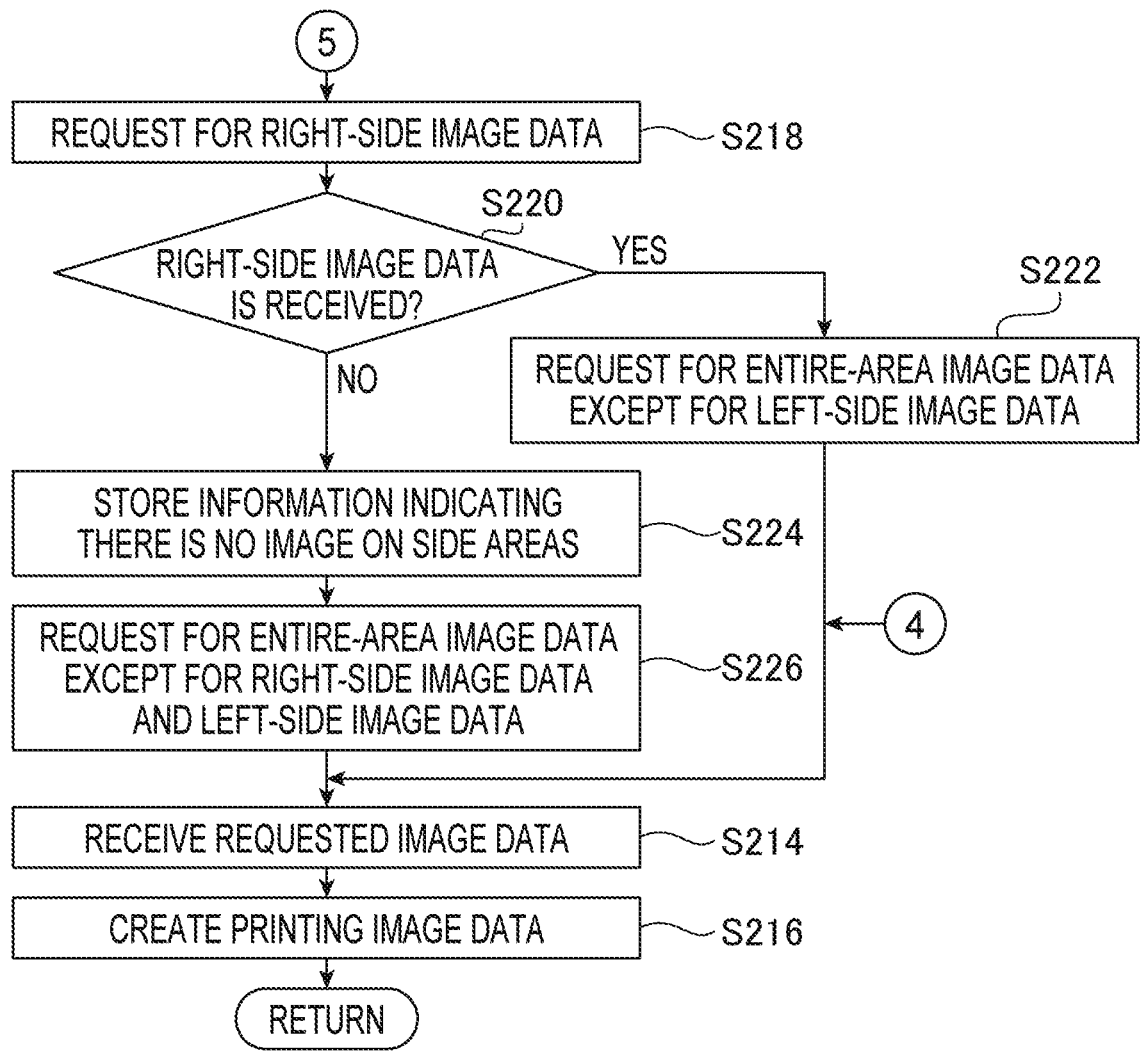
Figure 6:
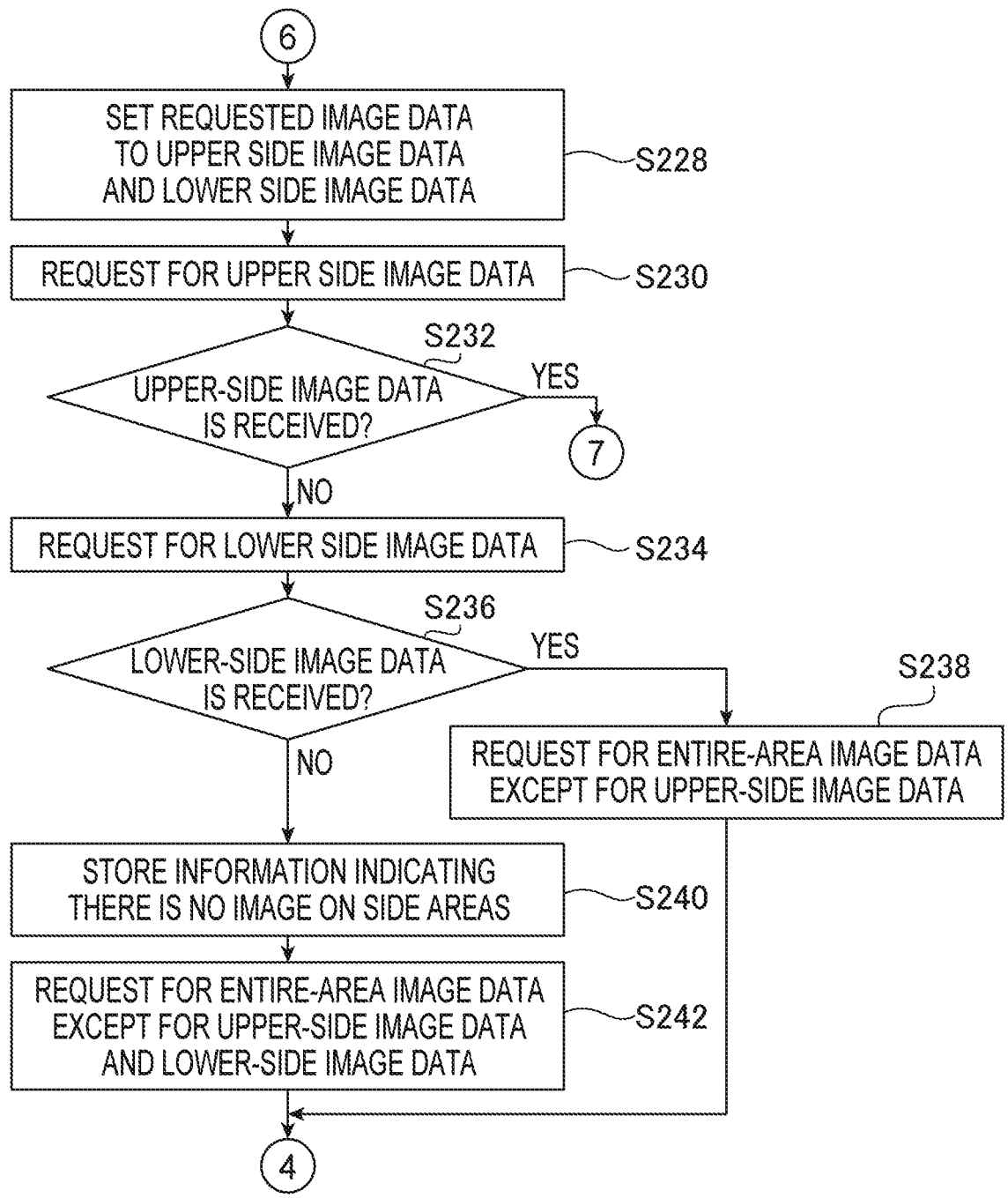

The flowcharts shown in FIGS. 2-3 is executed by the printer driver 28 when image data of an image subject to be printed has been created by the control program 26, and in response to operation of a start button for the printing process after the printer expected to perform the printing process has been selected. In the flowchart shown in FIGS. 2-3, firstly, the printer driver 28 receives printer information and setting information from the control program 26 through the OS 30 (S100). The printer information is information regarding a printer selected by the control program 26 (hereinafter, referred to as a selected printer), and includes, for example, information indicating a conveying direction of the printing sheet in the selected printer. For example, if the printer 50 is the selected printer, information indicating that the printing sheet is conveyed in the portrait-orientation direction is included in the printer information. Further, the setting information is information regarding print setting and includes information indicating a size of the printing sheet, information indicating whether the printing process to be performed is a both-side printing or a one-side printing, information indicating whether the image subject to be printed is a portrait-orientation image or a landscape-orientation image, and the like.

Next, the printer driver 28 receives a transmission instruction of banding information from the OS 30 (S102). The banding information is information indicating whether a banding setting is to be made. When the banding setting is made, transmission/reception of the image data using the above-described banding technique is performed. Therefore, when the transmission instruction of the banding information is received, the printer driver 28 outputs information indicating that the banding setting is made to the OS 30 (S104).

Next, the printer driver 28 transmits a job start command to the selected printer (S106). The job start command includes information regarding the print setting of the entire job. Next, the printer driver 28 transmits a page start command to the selected printer (S108). The page start command includes information regarding the print setting for each page. Next, the printer driver 28 determines whether the printing process is the both-side printing process (S110) based on the setting information received in S100.

When the printing process is not the both-side printing process (S110: NO), that is, the printing process is the one-side printing process, the printer driver 28 determines whether a current process is for an image of the first page (S112). When it is determined that the current process is for an image other than the image of the first page (S112: NO), the printer driver 28 proceeds to S114. When it is determined that the current process is for the image of the first page (S112: YES), the printer driver 28 proceeds to S115.

When it is determined that the printing process is the both-side printing process (S110: YES), the printer driver 28 determines whether the current process is for the image of the second page (S116). When it is determined that the current process is for an image of a page other than the second page (S116: NO), the printer driver 28 proceeds to S114. When it is determined the current process is for the image of the second image (S116: YES), the printer driver 28 proceeds to S115.

In S115, a side area image checking process subroutine is performed (S115) to determine whether there exists an image to be printed on the side areas. That is, for the image to be printed on the first page (when the one-side printing process is to be performed) or for the image to be printed on the second page (when the both-side printing process is to be performed), it is determined whether there exist an image to be printed on the side areas. In the side area image checking process subroutine, the printer driver 28 determines whether the image subject to be printed is the portrait-orientation image based on the setting information which the printer driver 28 received in S100 (S200). When the image subject to be printed is the portrait-orientation image (S200: YES), the printer driver 28 determines whether the printing sheet is conveyed in the portrait orientation in the selected printer (S202) based on the printer information received in S100. When it is determined that the printing sheet is conveyed in the portrait orientation in the selected printer (S202: YES), the printer driver 28 proceeds to S204. When it is determined that the printing sheet is not conveyed in the portrait orientation (S202: NO), that is, the printing sheet is conveyed in the landscape orientation, the printer driver 28 proceeds to S228.

When it is determined that the image subject to be printed is not the portrait-orientation image (S200: NO), that is, when the image subject to be printed is the landscape-orientation image, the printer driver 28 determines whether the printing sheet is conveyed in the portrait orientation in the selected printer based on the printer information received in S100 (S206). When it is determined that the printing sheet is conveyed in the portrait orientation in the selected printer (S206: YES), the printer driver 28 proceeds to S228. When it is determined that the printing sheet is not conveyed in the portrait orientation in the selected printer (S206: NO), that is, when the printing sheet is conveyed in the landscape orientation, the printer driver 28 proceeds to S204.

In S204, the right-and-left side image data is set as the image data becoming a base of determination of presence/absence of an image within the side areas, that is, the image data for which the printer driver 28 requests the OS 30. That is, when the portrait orientation image is to be printed on the printing sheet conveyed in the portrait orientation as shown in FIG. 7, and when the landscape orientation image is to be printed on the printing sheet conveyed in the landscape orientation as shown in FIG. 10, the right-and-left side image data is set as the image data for which the printer driver requests the OS 30. When the portrait orientation image is to be printed on the printing sheet conveyed in the portrait orientation as shown in FIG. 7, the side areas is the portrait-orientation side areas 72. When the landscape orientation image is to be printed on the printing sheet conveyed in the landscape orientation as shown in FIG. 10, the side areas is the landscape-orientation side areas 74.

Next, the printer driver 28 request the OS 30 for the left-side image data (S208). Then, the printer driver 28 determines whether the left-side image data, which is output by the OS 30 in response to the request therefor, is received from the OS 30 (S210). When it is determined that the left-side image data has been received (S210: YES), since there exists an image to be printed within the side area corresponding to the left-side image data, the printer driver 28 requests the OS 30 for the image data for an entire area of one page of image data (hereinafter, referred to as entire-area image data) including the left-side image data and the right-side image data (S212). Then, the printer driver 28 proceeds to S214.

When it is determined that the printer driver 28 has not received the left-side image data (S210: NO), there is no image to be printed on the side area corresponding to the left-side image data, the printer driver 28 requests the OS 30 for the right-side image data (S218). Then, it is determined whether the printer driver 28 has received the right-side image data, which is output by the OS 30 in response to the request for the right-side image data (S220). When it is determined that at least part of the right-side image data has been received (S220: YES), there exists an image to be printed on the side area corresponding to the right-side image data, while there does not exist an image to be printed on the side area corresponding to the left-side image data, and the printer driver 28 requests the OS 30 for the image data of the entire area except for the left-side image data (S222). Thereafter, the printer driver 28 proceeds to S214, and receives the image data of the central area and remaining part of the right side image data.

When it is determined that the right-side image data has not been received (S220: NO), there exists no image to be printed on the side area corresponding to the right-side image data or the side area corresponding to the left-side image data (i.e., no image to be printed on the entire side areas), the printer driver 28 stores information indicating that there is no images to be printed on the side areas in the data storage area 32 (S224). Then, the printer driver 28 requests the OS 30 for the image data for the entire area except for the right-and-left side image data (i.e., the image data for the central area) (S226). Thereafter, the printer driver 28 proceeds to S214, and receives the image data of the central area.

In S228, the upper-and-lower side image data is set as the image data becoming a base of determination of presence/absence of the image to be printed on the side areas, that is, the image data for which the printer driver 28 requests the OS 30. When the landscape-orientation image is printed on the printing sheet conveyed in the portrait orientation as shown in FIG. 9, and when the portrait-orientation image is printed on the printing sheet conveyed in the landscape orientation as shown in FIG. 8, the upper-and-lower side image data is set as the image data for which the printer driver 28 requests the OS 30. When the landscape-orientation image is printed on the printing sheet conveyed in the portrait orientation as shown in FIG. 9, the side areas is the portrait-orientation side areas 72. When the portrait-orientation image is printed on the printing sheet conveyed in the landscape orientation as shown in FIG. 8, the side areas is the landscape-orientation side areas 74.

Next, the printer driver 28 requests the OS 30 for the upper-side image data (S230). Then, the printer driver 28 determines whether the upper-side image data is received from the OS 30, which outputs the same in response to the request therefor (S232). When the upper-side image data has been received (S232: YES), there exists an image to be printed on the side area corresponding to the upper-side image data. Therefore, the printer driver 28 requests the OS 30 for the image data including the entire area for one page including the upper-side image data and the lower-side image data (S212). Then, the printer driver 28 proceeds to S214.

In S232, when the upper-side image data has not been received (S232: NO), there exists no image to be printed in the side areas corresponding to the upper-side image data. Therefore, the printer driver 28 requests the OS 30 for the lower-side image data (S234). Then, the printer driver 28 determines whether the printer driver has received the lower-side image data, for which the printer driver 28 requests the OS 30, from the OS 30 (S236). When the printer driver 28 has received at least part of the lower-side image data (S236: YES), there exists an image to be printed in the side area corresponding to the lower-side image data, and there exists no image to be printed in the side area corresponding to the upper-side image data. Therefore, the printer driver 28 requests the OS 30 for the image data for the entire area except for the upper-side image data (S238). Thereafter, the printer driver 28 proceeds to S214, and receives the image data of the central part and remaining part of the lower-side image data.

In S236, when the lower-side image data has not been received (S236: NO), there exists no image to be printed in the side areas corresponding to the lower-side image data and the upper-side image data. That is, there is no image to be printed in the entire area of the side areas. Therefore, the printer driver 28 stores information indicating the there is no image to be printed in the side areas in the data storage area 32 (S240). Then, the printer driver 28 requests the OS 30 for the image data for the entire area except for the upper-and-lower side image data (S242). Then, the printer driver 28 proceeds to S214, and receives the image data of the central area.

In S214, the printer driver 28 receives the image data, which is requested in S212, S222, S226, S238 or S242, from the OS 30 (S214). Then, the printer driver 28 creates the printing image data based on the received image data (S216). Then, the side area image checking process subroutine is terminated.

When the side area image checking process subroutine is terminated, the printer driver 28 returns to the main routine and determines whether there exists an image to be printed within the side areas (S117). That is, the printer driver 28 determines whether information indicating that there exists no image to be printed within the side areas is stored in the data storage area 32 in S224 or S240. When there is no image to be printed within the side areas (S117: NO), the printer driver 28 transmits an early conveyance start command (i.e., a command instructing a printer to start conveying of the printing sheet at an early stage) to the selected printer (S118). Then, the printer driver 28 proceeds to S119. It is noted that, when the early conveyance start command has received, the selected printer starts conveying the printing sheet after heating the fixing roller 60 with the heat roller 62 for a short period of time in comparison with a case where there exits an image to be printed within the side areas.

According to the above configuration, it becomes possible to shorten the time period necessary for perform printing.

In S117, when there exists an image to be printed within the side areas (S117: YES), the process of S118 is skipped (i.e., the early conveyance start command will not be transmitted) and the printer driver 28 proceeds to S119. Thus, when there exists an image to be printed within the side areas, the conveyance of the printing sheet is started after the fixing roller 60 is heated by the heated 62 for a particular period of time (i.e., X seconds) in the selected printer. According to the above-described configuration, the tonner image in the side areas of the printing sheet can be fixed appropriately.

Thereafter, the printer driver 28 transmits a drawing command including the created printing image data to the selected printer (S119). Next, the printer driver 28 transmits a page end command to the selected printer (S120). Then, the printer driver 28 determines whether the processes corresponding to all the pages contained in the job have been performed (S122). When the processes corresponding to all the pages have not been completed (S122: NO), the printer driver 28 returns to S108. When the processes corresponding to all the pages have been completed (S122: YES), the printer driver 28 transmits the job end command to the selected printer (S124). Then, the flowchart is completed.

In S114, the normal printing process is performed without determining absence/presence of an image to be printed within the side areas with respect to images of the pages other than the first page of the one-side printing process, or the images of the pages other than the second page of the both-side printing process. That is, the normal printing process is performed without determining whether there exist images to be printed within the side areas of the images of the pages other than the page which is printed firstly by the selected printer. In the normal printing process, the printer driver 28 requests the OS 30 for the entire-area image data and creates the printing image data based on the received entire-area image data. Then, the printer driver 28 transmits the drawing command including the created printing image data to the selected printer (S119). Thereafter, processes in S120 onwards are performed.

It is noted that the process of S100 performed by the CPU 12 is an example of a receiving process. The process of S117 performed by the CPU 12 is an example of a determining process. The process in S118 performed by the CPU 12 is an example of a first transmitting process. The process in S119 performed by the CPU 12 is an example of a second transmitting process. The processes of S204 and S228 performed by the CPU 12 are examples of a determining process. The process of S212 performed by the CPU 12 is an example of an outputting process. The process of S214 performed by the CPU 12 is an example of an obtaining process. The process of S216 performed by the CPU 12 is an example of a creating process. The printer 52 in which a printing sheet is conveyed in a landscape orientation direction is an example of a first type of printer. The printer 50 in which a printing sheet is conveyed in a portrait orientation direction is an example of a second type of printer.

According to the above-described illustrative embodiment, the effects indicated below can be achieved.

The printer driver 28 determines whether there is an image to be printed within the side areas of the printing sheet 70. When there is no image to be printed within the side areas, the printer driver 28 transmits the early conveyance start command to the selected printer. That is, when there is no image to be printed within the side areas, the printer driver 28 transmits the command to start conveying the printing sheet 70 at a timing earlier than in a case where there is an image to be printed within the side areas. According to the above configuration, a time period required for performing the printing operation can be shortened.

The printer driver 28 sets one of landscape-orientation side areas 74 and portrait-orientation side areas 72 as the side areas. The landscape-orientation side areas are defined at both ends, in the longitudinal direction of the A4 size (247 mm×210 mm) printing sheet 70, and each having a particular width. The portrait-orientation side areas are defined at both ends, in the direction perpendicular to the longitudinal direction of the A4 size printing sheet 70, and each having a particular width as the side areas. According to the above configuration, the areas at both end portions of the printing sheet which are press-contacted by the end portions of the fixing roller 60 can be set as the side areas. It is noted that the printer information is output by the control program 26 through the OS 30. As above, the side areas can be set appropriately.

Further, when the conveying direction of the A4 size printing sheet 70 is the longitudinal direction of the printing sheet 70, the printer driver 28 sets the portrait-orientation side areas 72 which are areas at the both end portions, in the direction perpendicular to the longitudinal direction of the printing sheet 70, each having a particular width, as the side areas. On the other handle, when the conveying direction of the A4 size printing sheet 70 is the direction perpendicular to the longitudinal direction of the printing sheet 70, the printer driver 28 sets the landscape-orientation side areas 74 which are areas at both end portions, in the longitudinal direction of the printing sheet 70, each having the particular width, as the side areas. According to the above configuration, the both end areas of the printing sheet 70 which are press-contacted by the both end portions of the fixing roller 60 can be set as the side areas.

When the printer driver 28 cannot obtain the image data of the image to be printed within the side areas from the OS 30, the printer driver 28 determines that there exists no image to be printed within the side areas. With the above configuration, whether there exists the image to be printed within the side areas can be determined appropriately. It is noted that, in response to a request for the image data of an image to be printed within the side areas transmitted from the printer driver 28, the OS 30 outputs the image data to the printer driver 28. When there is no image to be printed with the side areas, the OS 30 does not output the image data irrespective of the request from the printer driver 28. According to the configuration, it is possible to determine whether there exists an image to be printed within the side areas.

When the printer driver 28 has obtained the image data of the image to be printed within the side areas from the OS 30, the printer driver 28 determines that there exists the image to be printed within the side areas. When there exists the image to be printed within the side areas, the printer driver 28 requests the OS 30 for the entire area image data. Thus, the printer driver 28 obtains the image data of the image to be printed in the entire area of the printing sheet including the side areas in which there exists the image to be printed altogether, and creates the printing image data representing the image to be printed in the entire area of the printing sheet.

Further, the printer driver 28 determines whether there exists an image to be printed within the side areas with respect to the image of the first page for the one-side printing process or the image of the second page for the both-side printing process. In other words, whether there exists an image to be printed within the side areas is determined with respect only to a page to be printed firstly by the selected printer. According to this configuration, only in a case where heating by the heater 62 is to be started, it is determined whether there exists an image to be printed within the side areas, thereby unnecessary determination can be omitted.

It is noted that the aspects of the present disclosures should not be limited to the above-identified illustrative embodiment, but can be modified/improved in various ways based on knowledges of person skilled in the art. For example, according to the above-described embodiment, when the requested image data to be printed within the side areas has not been obtained, it is determined that there exists no image to be printed within the side areas, while, when the requested image data has been obtained, it is determined that there exists the image to be printed within the side areas. However, the above-mentioned configuration may be modified such that the printer driver 28 obtains the image data of the image to be printed within the side areas from the OS 30 and determines whether there exists the image to be printed within the side areas based on the obtained image data. That is, the printer driver 28 may quantify the image data obtained from the OS 30 (e.g., the drawing command included in the vector-format image data and the like) and determine absence/presence of the image to be printed within the side areas based on the quantified values.

For example, when the vector-format image data contains the drawing command indicating drawing at coordinates within the side areas, it may be determined that there exists an image to be printed within the side areas. Alternatively, the printer driver 28 may convert the vector-format image data to raster-format image data. In that case, the printer driver 28 may quantify the color of pixels, density and the like based on the raster-format image data, and determine whether there exists an image to be printed within the side areas based on the quantified values. For example, when the image data, from among the raster-format image data, corresponding to the image to be located within the side areas represents a value indicating the color other than white or transparent, the printer driver 28 may determine that there exists an image to be printed within the side areas.

Further, according to the illustrative embodiment, when there is no image to be printed within the side areas, the early conveyance start command is transmitted to the selected printer. However, the above configuration may be modified such that an amount of image to be printed within the side areas is equal to or less than a particular amount. In such a case, for example, when the image data is the vector-format image data, the qualified values of the drawing command or the like contained in the image data may be used as the amount of the image to be printed within the side areas. For example, based on the result of analysis of the drawing command indicating drawing of an image to the coordinates within the side areas, when the printer driver 28 determines that there exists an image to be printed within 10% or more of the side areas, the early conveyance start command may be transmitted to the selected printer.

Further, for example, when the image data is the raster-format image data, the qualified values of the color of pixels, thickness and the like may be used as the amount of image to be printed within the side areas. For example, when the printer driver 28 determines that there exists an image data having a numeral value indicating color other than white or transparent and an area of the image is 10% or more of the side areas, the early conveyance start command may be transmitted to the selected printer.

According to the illustrative embodiment, as shown in FIGS. 7-10, one heater 62 is arranged at a central portion, in the axial direction, of the fixing roller 60. The above configuration may be modified such that, as shown in FIG. 11, two heaters 62c may be arranged at the central positions, in the axial direction, of the fixing roller 60c with being separate from each other. In such a modification, portions of the printing sheet 70 which are press-contacted by portions of the fixing roller 60c where the heaters 62c are not arranged are portions corresponding to the side areas in the illustrative embodiment. That is, in the printing sheet 70 shown in FIG. 11, areas 76 at both ends, in a direction perpendicular to the longitudinal direction of the printing sheet 70, each having a particular width, and an area 77, which also has a particular width, spaced from the areas 76 at both ends of the printing sheet 70 serve as areas similar to the side areas of the illustrative embodiment. In that case, two areas each of which is sandwiched by the area 77 and one of side areas 76 serve as an area similar to the central area of the illustrative embodiment.

In the above-described embodiment, the heater 62 is arranged at the central portion, in the axial direction, of the fixing roller 60, and the end positions of the heater 62 do not reach the end portions of the fixing roller 60, respectively. However, in a modified embodiment, the heater 62 may be extended such that both ends of the heater 62 reach the end of the fixing roller 60, respectively. That is, the heater 62 may be arranged to extend over an entire area, in the axial direction, of the fixing roller 60 which contacts the printing sheet 70 when the fixing process is performed. Even if the heater 62 is arranged to extend over the entire area, in the axial direction, of the fixing roller 60, since the axial end portions of the fixing roller 60 is less easy to be heated than the central portion, the configuration according to the aspects of the present disclosure is applicable to such a configuration.

In the above-described illustrative embodiment, areas each having the particular width at both ends of the printing sheet are defined as the side areas. However, in a modified embodiment, a single area having a particular width and defined at one of both ends of the printing sheet may be used as the side area. Further, the area need not be limited to be the end portions of the printing sheet, but any portion other than the end portions of the printing sheet (e.g., at a central portion) may be regarded as a particular area, and the particular area may be treated same as the side areas in the above-described illustrative embodiment. When, for example, a printer is configured such that the central portion of the fixing roller is heated less easy than the end portions of the fixing roller, the central portion is treated as the particular area.

In the above-described embodiment, the printer driver 28 determines absence/presence of an image to be printed within the side areas. In a modified embodiment, the control program 26 or the OS 30 may perform the processes shown in FIGS. 2-6 to determine absence/presence of an image to be printed within the side areas. For example, a function of determining absence/presence of the image to be printed within the side areas, a function of creating printing image data and a function of generating commands and transmitting respective commands to the printer may be realized by the control program 26. In such a case, the control program 26 itself may determine whether there exists an image to be printed within the side areas based on the image data created by the control program 26, generate a command and transmit the same.

Alternatively, the control program 26 itself may determine whether there exists an image to be printed within the side areas, and transmit information indicating whether there exists an image to be printed within the side areas to the printer driver 28. In such a case, the printer driver 28 need not have a function of determining whether there exists an image to be printed within the side areas. Thus, the printer driver 28 may make decision in S117 of FIG. 3 using the information output by the control program 26.

Further alternatively, the OS 30 may have a function of determining whether there exists an image to be printed within the side areas based on the image data created by the control program 26, a function of creating the printing image data and a function of creating a command and transmitting the created command to the printer.

In the above-described embodiment, in the printer information which the printer driver 28 obtains in S100, information indicating the conveying direction of the printing sheet in the selected printer is included. In a modified embodiment, the printer information may include model information indicating a model of the selected printer. In such a case, the printer driver 28 identifies the conveying direction corresponding to the model information (of the selected printer).

Alternatively, the printer driver 28 may receive the printer information which has been provided, in advance, to the control program 26 in S100. Still alternatively, a printer, from among a plurality of printers, may be set to the printer driver 28 as a destination of an instruction of a printing process. In that case, information identifying the set printer is the printer information. Further alternatively, a model of a printer corresponding to the printer driver 28 may have already been set to the printer driver 28, and the printer information may be information of the model of the printer.

According to the illustrative embodiment, in the printers 50 and 52, after an image of the even-number page is printed on one surface of the printing sheet when the both-side printing process is performed, an image of the odd-number page which is in front of the above even-number page is printed on the other surface of the printing sheet. It is noted that which page is firstly printed when the both-side printing process is performed is different depending on the model of the printer. For example, there is a model in which the first page, the fourth page or the sixth page is firstly printed. Therefore, when the printing process is the both-side printing process (S110: YES), the printer driver 28 determines whether the currently performed process is a process for the image of the second page (S116), but may determine whether the currently performed process is a process for the page firstly printed instead of the process of S116.

In the illustrative embodiment, in S222, S226, S238 and S242, the printer driver 28 requests the OS 30 for the image data excluding part of image data from among the entire-area image data. This configuration may be modified such that the printer driver 28 requests the OS 30 all the pieces of the entire-area image data.

In the illustrative embodiment, aspects of the present disclosure are applied to the laser printer. It is noted that aspects of the present disclosure may be applied to the inkjet printer.

In the illustrative embodiment described above, the processes shown in FIGS. 2-6 are executed by the CPU 12. It is noted the processes may not be performed by the CPU 12 but performed by an ASIC or other logical circuit(s). Further, the processes may be executed by a combination of the CPU, an ASIC or any other logical integrated circuits.

What is claimed is:

1. A non-transitory computer-readable recording medium containing computer-executable instructions to be executed by a computer of a terminal device having a communication interface configured to communicate with a printer, the printer being configured to print an image on a conveyed recording medium, and
wherein the instructions cause, when executed by the computer, the terminal device to perform:
determining whether, based on image data indicating an image to be printed by the printer, an amount of a side area image is equal to or less than a particular amount, the side area image being an image arranged within side areas of the recording medium and being an image to be printed on the recording medium by the printer, the side areas being defined to be end portions of the recording medium and having a particular width; and
when the amount of the side area image within the side areas is determined to be equal to or less than the particular amount, transmitting a command, which causes the printer to start conveying of the recording medium at a first timing, to the printer through the communication interface, the first timing being a timing earlier than a second timing at which conveying of a same recording medium is started when the amount of the side area image within the side areas is determined to be more than the particular amount.

2. The non-transitory computer-readable recording medium according to claim 1, wherein the instructions cause, when executed by the computer, the terminal device to perform determining whether, based on the image data indicating the image to be printed by the printer, an amount of side area image is equal to or less than the particular amount, the side area image being an image arranged within side areas defined to be both opposing end portions of the recording medium to be conveyed by the printer, the side areas having the particular width.

3. The non-transitory computer-readable recording medium according to claim 2, wherein the instructions cause, when executed by the computer, the terminal device to perform, when the amount of the side area image within at least one of the side areas is determined to be more than the particular amount, transmitting the command, which causes the printer to start conveying of the recording medium at the second timing, to the printer through the communication interface.

4. The non-transitory computer-readable recording medium according to claim 1,
wherein the recording medium having a rectangular shape, and
wherein the instructions cause, when executed by the computer, the terminal device to perform:
when a model of the printer is a first type of printer, determining first side areas as the side areas, the first side area being defined to be both end portions, in a longitudinal direction, of the recording medium and having the particular width;
when the model of the printer is a second type of printer, determining second side areas as the side areas, the second side areas being defined to be both end portions, in a direction perpendicular to the longitudinal direction, of the recording medium and having the particular width; and
determining whether, based on the image data indicating the image to be printed by the printer, an amount of side area image within the determined side areas is equal to or less than the particular amount.

5. The non-transitory computer-readable recording medium according to claim 4,
wherein the first type of printer conveys the recording medium along the direction perpendicular to the longitudinal direction of the recording medium, and
wherein the second type of printer conveys the recording medium along the longitudinal direction of the recording medium.

6. The non-transitory computer-readable recording medium according to claim 1, wherein the instructions cause, when executed by the computer, the terminal device to perform:
receiving model information indicating a model of the printer; and
determining the first side areas as the side areas when the received model information indicates the first type of printer and determining the second side areas as the side areas when the received model information indicates the second type of printer.

7. The non-transitory computer-readable recording medium according to claim 2,
wherein the recording medium having a rectangular shape, and
wherein the instructions cause, when executed by the computer, the terminal device to perform:
when a conveying direction of the recording medium in the printer is along the longitudinal direction, determining second side areas as the side areas, the second side areas being defined to be both end portions, in a direction perpendicular to a longitudinal direction, of the recording medium and having the particular width;
when the conveying direction of the recording medium in the printer is perpendicular to the longitudinal direction, determining first side areas as the side areas, the first side areas being defined to be both end portions, in the longitudinal direction, of the recording medium and having the particular width; and
determining whether, based on the image data indicating the image to be printed by the printer, an amount of side area image within the determined side areas is equal to or less than the particular amount.

8. The non-transitory computer-readable recording medium according to claim 1, wherein the instructions cause, when executed by the computer, the terminal device to perform, when there exists no image to be located within the side areas, determining that the amount of the side area image within the side areas is equal to or less than the particular amount.

9. The non-transitory computer-readable recording medium according to claim 1, wherein the instructions cause, when executed by the computer, the terminal device to perform:
obtaining image data of the image to be printed by the printer from an external program, the external program being a program different from the instructions to be executed by the terminal device;
creating printing image data based on the obtaining image data; and
transmitting the created printing image data to the printer through the communication interface, and
wherein the instructions cause, when executed by the computer, the terminal device to perform, when image data indicating the side area image within the side areas is not contained in the obtained image data, determining that the amount of the side area image within the side areas is equal to or less than the particular amount.

10. The non-transitory computer-readable recording medium according to claim 9, wherein the instructions cause, when executed by the computer, the terminal device to perform:

transmitting a request for image data indicating the image to be printed by the printer to the external program and obtaining the image data output from the external program in response to the request; and when the image data indicating the image within the side areas is not obtained even if a request for image data indicating the side area image within the side areas is transmitted to the external program, determining that the amount of the side area image within the side areas is equal to or less than the particular amount.

11. The non-transitory computer-readable recording medium according to claim 10, wherein the instructions cause, when executed by the computer, the terminal device to perform:

determining that the amount of the side area image within the side areas is not equal to and less than the particular amount when the image data indicating the side area image within the side areas is obtained in response to the request for the image data indicating the side area image within the side areas;

when determining that the amount of the side area image within the side areas is not equal to and less than the particular amount, outputting a second request for entire-area image data indicating an entire-area image to be printed within an entire-area of the recording medium including the side areas;

obtaining the entire-area image data output from the external program in response to the second request; and creating the printing data based on the obtained entire-area image data.

12. The non-transitory computer-readable recording medium according to claim 11, wherein the instructions cause, when executed by the computer, the terminal device to perform:

when a plurality of pages are to be printed by the printer, determining whether the amount of the image within the side areas of a first image, which is an image in a page to be printed firstly by the printer from among the plurality of pages, is equal to or less than the particular amount.

13. A non-transitory computer-readable recording medium containing computer-executable instructions to be executed by a computer of a terminal device having a communication interface configured to communicate with a printer, the printer being configured to print an image on a conveyed recording medium, and wherein the instructions cause, when executed by the computer, the terminal device to perform:

determining whether, based on image data indicating an image to be printed by the printer, an amount of a particular image is equal to or less than a particular amount, the particular image being an image arranged within a particular area of the recording medium and being an image to be printed on the recording medium by the printer, the particular area being defined to be a particular position of the recording medium to be conveyed by the printer and having a particular width; and when the amount of the image within the particular area is determined to be equal to or less than the particular amount, transmitting a command instructing the printer to start conveying of the recording medium at a first timing, to the printer through the communication interface, the first timing being a timing earlier than a second timing at which conveying of a same recording medium is started when the amount of the image within the particular area is determined to be more than the particular amount.

14. A terminal device comprising:

a computer; and a communication interface configured to communicate with a printer, the printer being configured to print an image on a conveyed recording medium; and wherein the computer is configured to perform:

determining whether, based on image data indicating an image to be printed by the printer, an amount of a side area image is equal to or less than a particular amount, the side area image being an image arranged within side areas of the recording medium and being an image to be printed on the recording medium by the printer, the side area being defined to be end portions of the recording medium to be conveyed by the printer and having a particular width; and when the amount of the image within the side areas is determined to be equal to or less than the particular amount, transmitting a command instructing the printer to start conveying of the recording medium at a first timing, to the printer through the communication interface, the first timing being a timing earlier than a second timing at which conveying of a same recording medium is started when the amount of the image within the side areas is determined to be more than the particular amount.

15. A terminal device comprising:

a computer; and a communication interface configured to communicate with a printer, the printer being configured to print an image on a conveyed recording medium; and wherein the computer is configured to perform:

determining whether, based on image data indicating an image to be printed by the printer, an amount of a particular image is equal to or less than a particular amount, the particular image being an image arranged within a particular area of the recording medium and being an image to be printed on the recording medium by the printer, the particular area being defined to be a particular portion of the recording medium to be conveyed by the printer and having a particular width; and when the amount of the image within the particular area is determined to be equal to or less than the particular amount, transmitting a command instructing the printer to start conveying of the recording medium at a first timing, to the printer through the communication interface, the first timing being a timing earlier than a second timing at which conveying of a same recording medium is started when the amount of the image within the particular area is determined to be more than the particular amount.

* * * * *

UNITED STATES PATENT AND TRADEMARK OFFICE
CERTIFICATE OF CORRECTION

Page 1 of 1

PATENT NO.        : 11,023,792 B2
APPLICATION NO.   : 16/561389
DATED             : June 1, 2021
INVENTOR(S)       : Mareyuki Murata It is certified that error appears in the above-identified patent and that said Letters Patent is hereby corrected as shown below:

In the Claims

Column 18, Claim 7, Line 28 should read:
the printer is along a longitudinal direction, deter- Column 18, Claim 7, Line 31 should read:
direction perpendicular to the longitudinal direction, of Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*